United States Patent
Chen et al.

(10) Patent No.: US 10,320,525 B2
(45) Date of Patent: *Jun. 11, 2019

(54) UPLINK FEEDBACK METHOD, USER EQUIPMENT, AND BASE STATION

(71) Applicant: Huawei Technologies Co., Ltd., Shenzhen (CN)

(72) Inventors: Dong Chen, Shanghai (CN); Xiaoying Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/656,866

(22) Filed: Jul. 21, 2017

(65) Prior Publication Data
US 2017/0324516 A1    Nov. 9, 2017

Related U.S. Application Data

(63) Continuation of application No. 14/804,096, filed on Jul. 20, 2015, now Pat. No. 9,735,924, which is a
(Continued)

(51) Int. Cl.
*H04L 1/00* (2006.01)
*H04L 1/18* (2006.01)
(Continued)

(52) U.S. Cl.
CPC .......... *H04L 1/0073* (2013.01); *H04L 1/1812* (2013.01); *H04L 1/1861* (2013.01); *H04L 1/1671* (2013.01); *H04W 72/02* (2013.01)

(58) Field of Classification Search
CPC .... H04L 1/0073; H04L 1/1812; H04L 1/1861
See application file for complete search history.

(56) References Cited

U.S. PATENT DOCUMENTS

2009/0129317 A1  5/2009  Che et al.
2009/0154412 A1  6/2009  Wang et al.
(Continued)

FOREIGN PATENT DOCUMENTS

CN    101635987 A    1/2010
CN    101686435 A    3/2010
(Continued)

OTHER PUBLICATIONS

"3rd Generation Partnership Project; Technical Specification Group Radio Access Network; Radio Resource Control (RRC); Protocol specification (Release 11)," 3GPP TS 25.331, V 11.4.0, pp. 1-2056, 3rd Generation Partnership roject, Valbonne, France (Dec. 2012).

*Primary Examiner* — Gary Mui
(74) *Attorney, Agent, or Firm* — Leydig, Voit & Mayer, Ltd.

(57) ABSTRACT

The present invention provides an uplink feedback method, user equipment, and a base station, where the method includes: detecting, by user equipment, downlink data in at least two consecutive downlink sub-frames; performing joint encoding, by the user equipment, for a feedback for the downlink data in the at least two consecutive downlink sub-frames; and transmitting, by the user equipment in an uplink sub-frame corresponding to the last sub-frame of the at least two consecutive downlink sub-frames, joint uplink feedback information for the at least two consecutive downlink sub-frames, so as to resolve issue how uplink feedback is performed when downlink bandwidth is different from uplink bandwidth.

20 Claims, 4 Drawing Sheets

Related U.S. Application Data continuation of application No. PCT/CN2013/070784, filed on Jan. 21, 2013.

(51) Int. Cl.
*H04W 72/02* (2009.01)
*H04L 1/16* (2006.01)

(56) References Cited

U.S. PATENT DOCUMENTS

| | | |
|---|---|---|
| 2009/0196204 A1 | 8/2009 | Astely et al. |
| 2010/0172428 A1 | 7/2010 | Pani et al. |
| 2011/0085511 A1 | 4/2011 | Fan et al. |
| 2011/0103286 A1 | 5/2011 | Montojo et al. |
| 2011/0110262 A1 | 5/2011 | Yu et al. |
| 2011/0249656 A1 | 10/2011 | Cai et al. |
| 2011/0268059 A1 | 11/2011 | Li et al. |
| 2011/0268090 A1* | 11/2011 | Qu .................... H03M 13/136 370/335 |
| 2012/0093040 A1 | 4/2012 | Wu et al. |
| 2013/0077541 A1 | 3/2013 | Lin et al. |
| 2013/0308612 A1 | 11/2013 | Cai et al. |

FOREIGN PATENT DOCUMENTS

| | | |
|---|---|---|
| CN | 101729128 A | 6/2010 |
| CN | 101925110 A | 12/2010 |
| CN | 102347826 A | 2/2012 |
| WO | 2013070168 A1 | 5/2013 |

* cited by examiner

UPLINK FEEDBACK METHOD, USER EQUIPMENT, AND BASE STATION

CROSS-REFERENCE TO RELATED APPLICATIONS

This application is a continuation of U.S. application Ser. No. 14/804,096, filed on Jul. 20, 2015, which is a continuation of International Patent Application No. PCT/CN2013/070784, filed on Jan. 21, 2013. All of the afore-mentioned patent applications are hereby incorporated by reference in their entireties.

TECHNICAL FIELD

The present invention relates to the field of communications technologies, and in particular, to an uplink feedback method, user equipment, and a base station.

BACKGROUND

In the prior art, the frequency band of the Universal Mobile Telecommunications System (Universal Mobile Telecommunications System, UMTS for short) is 5 MHz wide, a network transmits and receives data on same uplink and downlink bandwidth, and user equipment (User Equipment, UE for short) also transmits and receives data on same bandwidth.

A narrow-band UMTS system has relatively high spectral efficiency. For the uplink, if a 5 MHz band is divided into multiple subcarriers, uplink interference between UEs on different subcarriers will decrease. Therefore, a high uplink throughput is obtained when the UEs perform uplink transmission in a narrow-band system.

When the downlink band is 5 MHz, and the 5 MHz uplink band is divided into two subcarriers, the length of a downlink sub-frame is half that of an uplink subcarrier. When downlink carrier bandwidth is N times uplink carrier bandwidth, a length of a downlink sub-frame or transmission time interval is 1/N of a length of an uplink sub-frame or transmission time interval. For timing of all uplink channels of N uplink carriers, reference is made to a channel of a same downlink carrier.

However, narrow bandwidth makes it difficult to perform uplink feedback in a scenario in which downlink bandwidth is different from uplink bandwidth.

In addition, in other systems in which an uplink transmission time interval (such as a length of a sub-frame) is greater than a downlink transmission time interval (such as a length of a sub-frame), the same uplink feedback issue exists.

SUMMARY

Embodiments of the present invention provide an uplink feedback method, user equipment, and a base station, to resolve the issue how uplink feedback is performed when downlink bandwidth is greater than uplink bandwidth or when an uplink transmission time interval is greater than a downlink transmission time interval.

According to a first aspect, an embodiment of the present invention provides an uplink feedback method, including:
  detecting, by user equipment, downlink data in at least two consecutive downlink sub-frames;
  performing joint encoding, by the user equipment, for a feedback for the downlink data in the at least two consecutive downlink sub-frames; and
  transmitting, by the user equipment in an uplink sub-frame corresponding to the last sub-frame of the at least two consecutive downlink sub-frames, joint uplink feedback information for the at least two consecutive downlink sub-frames.

In a first possible implementation manner of the first aspect, the at least two consecutive downlink sub-frames are at least two consecutive downlink sub-frames on a single carrier.

According to the first possible implementation manner of the first aspect, in a second possible implementation manner, a sum of lengths of the at least two consecutive downlink sub-frames on the single carrier is equal to a length of the uplink sub-frame.

According to the first possible implementation manner of the first aspect, in a third possible implementation manner, the at least two consecutive downlink sub-frames include at least two consecutive downlink sub-frames of a primary cell of the user equipment; or
  the at least two consecutive downlink sub-frames include at least two consecutive downlink sub-frames of a secondary cell of the user equipment.

According to the first aspect, in a fourth possible implementation manner, a sum of lengths of downlink sub-frames of the primary cell is equal to a length of an uplink sub-frame of the primary cell; or
  a sum of lengths of downlink sub-frames of the secondary cell is equal to a length of an uplink sub-frame of the primary cell.

With reference to the first aspect, the first possible implementation manner of the first aspect, the second possible implementation manner of the first aspect, the third possible implementation manner of the first aspect, and the fourth possible implementation manner of the first aspect, in a fifth possible implementation manner, the joint uplink feedback information includes joint encoding information of the at least two consecutive downlink sub-frames.

With reference to the first aspect, the first possible implementation manner of the first aspect, the second possible implementation manner of the first aspect, the third possible implementation manner of the first aspect, and the fourth possible implementation manner of the first aspect, in a sixth possible implementation manner, a quantity of pieces of HARQ feedback information in the joint encoding information is greater than a quantity of cells.

According to a second aspect, an embodiment of the present invention provides an uplink feedback method, including:
  transmitting, by a base station, downlink data to user equipment; and
  receiving, by the base station in an uplink sub-frame corresponding to at least two consecutive downlink sub-frames, joint uplink feedback information that is for the at least two consecutive downlink sub-frames and transmitted by the user equipment.

In a first possible implementation manner of the second aspect, the at least two consecutive downlink sub-frames are at least two consecutive downlink sub-frames on a single carrier.

According to the first possible implementation manner of the second aspect, in a second possible implementation manner, a sum of lengths of the at least two consecutive downlink sub-frames on the single carrier is equal to a length of the uplink sub-frame.

According to the first possible implementation manner of the second aspect, in a third possible implementation manner of the second aspect, the at least two consecutive downlink sub-frames include at least two consecutive downlink sub-frames of a primary cell of the user equipment; or the at least two consecutive downlink sub-frames include at least two consecutive downlink sub-frames of a secondary cell of the user equipment.

According to the second aspect, in a fourth possible implementation manner, a sum of lengths of downlink sub-frames of the primary cell is equal to a length of an uplink sub-frame of the primary cell; or a sum of lengths of downlink sub-frames of the secondary cell is equal to a length of an uplink sub-frame of the primary cell.

With reference to the second aspect, the first possible implementation manner of the second aspect, the second possible implementation manner of the second aspect, the third possible implementation manner of the second aspect, and the fourth possible implementation manner of the second aspect, in a fifth possible implementation manner, the joint uplink feedback information includes joint encoding information of the at least two consecutive downlink sub-frames.

With reference to the second aspect, the first possible implementation manner of the second aspect, the second possible implementation manner of the second aspect, the third possible implementation manner of the second aspect, and the fourth possible implementation manner of the second aspect, in a sixth possible implementation manner, a quantity of pieces of HARQ feedback information in the joint encoding information is greater than a quantity of cells.

According to a third aspect, an embodiment of the present invention provides user equipment, including:

a data receiving module, configured to detect downlink data in at least two consecutive downlink sub-frames;

a joint encoding module, configured to perform joint encoding for a feedback for the downlink data in the at least two consecutive downlink sub-frames; and a feedback information transmitting module, configured to transmit, in an uplink sub-frame corresponding to the last sub-frame of the at least two consecutive downlink sub-frames, joint uplink feedback information for the at least two consecutive downlink sub-frames.

In a first possible implementation manner of the third aspect, the at least two consecutive downlink sub-frames are at least two consecutive downlink sub-frames on a single carrier.

According to the first possible implementation manner of the third aspect, in a second possible implementation manner, a sum of lengths of the at least two consecutive downlink sub-frames on the single carrier is equal to a length of the uplink sub-frame.

According to the third aspect, in a third possible implementation manner of the third aspect, the at least two consecutive downlink sub-frames include at least two consecutive downlink sub-frames of a primary cell of the user equipment; or the at least two consecutive downlink sub-frames include at least two consecutive downlink sub-frames of a secondary cell of the user equipment.

According to the third possible implementation manner of the third aspect, in a fourth possible implementation manner, a sum of lengths of downlink sub-frames of the primary cell is equal to a length of an uplink sub-frame of the primary cell; or a sum of lengths of downlink sub-frames of the secondary cell is equal to a length of an uplink sub-frame of the primary cell.

With reference to the third aspect, the first possible implementation manner of the third aspect, the second possible implementation manner of the third aspect, the third possible implementation manner of the third aspect, and the fourth possible implementation manner of the third aspect, in a fifth possible implementation manner, the joint uplink feedback information includes joint encoding information of the at least two consecutive downlink sub-frames.

With reference to the third aspect, the first possible implementation manner of the third aspect, the second possible implementation manner of the third aspect, the third possible implementation manner of the third aspect, and the fourth possible implementation manner of the third aspect, in a sixth possible implementation manner, a quantity of pieces of HARQ feedback information in the joint encoding information is greater than a quantity of cells.

According to a fourth aspect, an embodiment of the present invention provides a base station, including:

a data transmitting module, configured to transmit downlink data to user equipment; and a feedback information receiving module, configured to receive, in an uplink sub-frame corresponding to at least two sub-frames, joint uplink feedback information that is for the at least two consecutive downlink sub-frames and transmitted by the user equipment.

In a first possible implementation manner of the fourth aspect, the at least two consecutive downlink sub-frames are at least two consecutive downlink sub-frames on a single carrier.

According to the first possible implementation manner of the fourth aspect, in a second possible implementation manner, a sum of lengths of the at least two consecutive downlink sub-frames on the single carrier is equal to a length of the uplink sub-frame.

According to the fourth aspect, in a third possible implementation manner, the at least two consecutive downlink sub-frames include at least two consecutive downlink sub-frames of a primary cell of the user equipment; or the at least two consecutive downlink sub-frames include at least two consecutive downlink sub-frames of a secondary cell of the user equipment.

According to the third possible implementation manner of the fourth aspect, in a fourth possible implementation manner, a sum of lengths of downlink sub-frames of the primary cell is equal to a length of an uplink sub-frame of the primary cell; or a sum of lengths of downlink sub-frames of the secondary cell is equal to a length of an uplink sub-frame of the primary cell.

With reference to the fourth aspect, the first possible implementation manner of the fourth aspect, the second possible implementation manner of the fourth aspect, the third possible implementation manner of the fourth aspect, and the fourth possible implementation manner of the fourth aspect, in a fifth possible implementation manner, the joint uplink feedback information includes joint encoding information of the at least two consecutive downlink sub-frames.

With reference to the fourth aspect, the first possible implementation manner of the fourth aspect, the second possible implementation manner of the fourth aspect, the third possible implementation manner of the fourth aspect, and the fourth possible implementation manner of the fourth aspect, in a sixth possible implementation manner, a quantity of pieces of HARQ feedback information in the joint encoding information is greater than a quantity of cells.

According to a fifth aspect, an embodiment of the present invention provides user equipment, including:
- a receiver, configured to detect downlink data in at least two consecutive downlink sub-frames;
- a processor, configured to perform joint encoding for a feedback for the downlink data in the at least two consecutive downlink sub-frames; and
- a transmitter, configured to transmit, in an uplink sub-frame corresponding to the last sub-frame of the at least two consecutive downlink sub-frames, joint uplink feedback information for the at least two consecutive downlink sub-frames.

In a first possible implementation manner of the fifth aspect, the at least two consecutive downlink sub-frames are at least two consecutive downlink sub-frames on a single carrier.

According to the first possible implementation manner of the fifth aspect, in a second possible implementation manner, a sum of lengths of the at least two consecutive downlink sub-frames on the single carrier is equal to a length of the uplink sub-frame.

According to the fifth aspect, in a third possible implementation manner, the at least two consecutive downlink sub-frames include at least two consecutive downlink sub-frames of a primary cell of the user equipment; or
the at least two consecutive downlink sub-frames include at least two consecutive downlink sub-frames of a secondary cell of the user equipment.

According to the third possible implementation manner of the fifth aspect, in a fourth possible implementation manner, a sum of lengths of downlink sub-frames of the primary cell is equal to a length of an uplink sub-frame of the primary cell; or
a sum of lengths of downlink sub-frames of the secondary cell is equal to a length of an uplink sub-frame of the primary cell.

With reference to the fifth aspect, the first possible implementation manner of the fifth aspect, the second possible implementation manner of the fifth aspect, the third possible implementation manner of the fifth aspect, and the fourth possible implementation manner of the fifth aspect, in a fifth possible implementation manner, the joint uplink feedback information includes joint encoding information of the at least two consecutive downlink sub-frames.

With reference to the fifth aspect, the first possible implementation manner of the fifth aspect, the second possible implementation manner of the fifth aspect, the third possible implementation manner of the fifth aspect, and the fourth possible implementation manner of the fifth aspect, in a sixth possible implementation manner, a quantity of pieces of HARQ feedback information in the joint encoding information is greater than a quantity of cells.

According to a sixth aspect, an embodiment of the present invention provides a base station, including:
- a transmitter, configured to transmit downlink data to user equipment; and
- a receiver, configured to receive, in an uplink sub-frame corresponding to at least two consecutive downlink sub-frames, joint uplink feedback information that is for the at least two consecutive downlink sub-frames and transmitted by the user equipment.

In a first possible implementation manner of the sixth aspect, the at least two consecutive downlink sub-frames are at least two consecutive downlink sub-frames on a single carrier.

According to the first possible implementation manner of the sixth aspect, in a second possible implementation manner, a sum of lengths of the at least two consecutive downlink sub-frames on the single carrier is equal to a length of the uplink sub-frame.

According to the sixth aspect, in a third possible implementation manner, the at least two consecutive downlink sub-frames include at least two consecutive downlink sub-frames of a primary cell of the user equipment; or
the at least two consecutive downlink sub-frames include at least two consecutive downlink sub-frames of a secondary cell of the user equipment.

According to the third possible implementation manner of the sixth aspect, in a fourth possible implementation manner, a sum of lengths of downlink sub-frames of the primary cell is equal to a length of an uplink sub-frame of the primary cell; or
a sum of lengths of downlink sub-frames of the secondary cell is equal to a length of an uplink sub-frame of the primary cell.

With reference to the sixth aspect, the first possible implementation manner of the sixth aspect, the second possible implementation manner of the sixth aspect, the third possible implementation manner of the sixth aspect, and the fourth possible implementation manner of the sixth aspect, in a fifth possible implementation manner, the joint uplink feedback information includes joint encoding information of the at least two consecutive downlink sub-frames.

With reference to the sixth aspect, the first possible implementation manner of the sixth aspect, the second possible implementation manner of the sixth aspect, the third possible implementation manner of the sixth aspect, and the fourth possible implementation manner of the sixth aspect, in a sixth possible implementation manner, a quantity of pieces of HARQ feedback information in the joint encoding information is greater than a quantity of cells.

According to the uplink feedback method, the user equipment, and the base station that are provided in the embodiments of the present invention, a base station uses at least two consecutive downlink sub-frames to transmit downlink data to user equipment, and the user equipment transmits, in an uplink sub-frame corresponding to the at least two consecutive downlink sub-frames, joint uplink feedback information for the at least two consecutive downlink sub-frames to the base station, which implements uplink feedback when downlink bandwidth is different from uplink bandwidth or when an uplink transmission time interval is greater than a downlink transmission time interval.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

Figure 1:
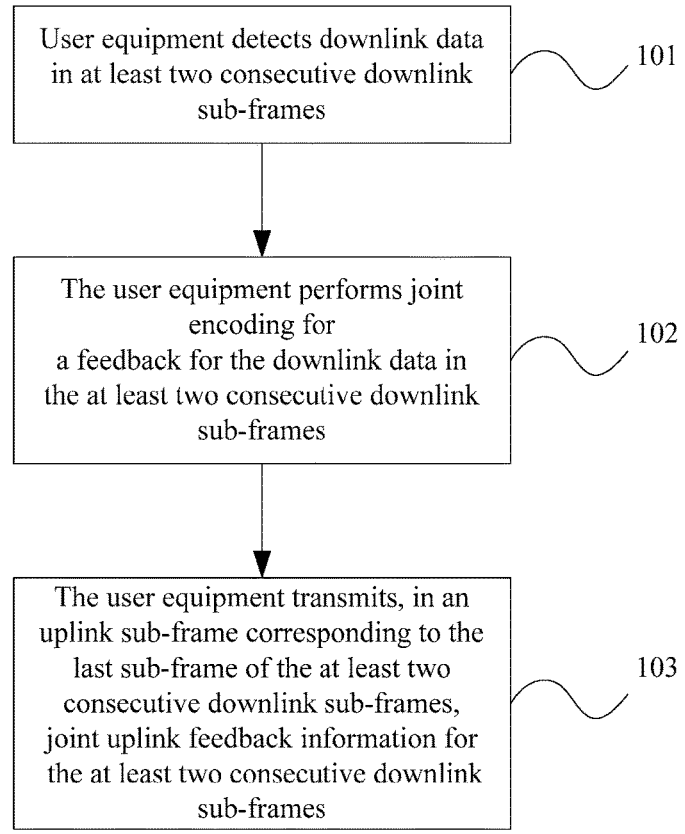
FIG. 1 is a flowchart of Embodiment 1 of an uplink feedback method according to the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technology described in this specification may be used in various types of mobile communications systems in which uplink bandwidth is unequal to downlink bandwidth, such as the universal mobile telecommunications system (UMTS, Universal Mobile Telecommunications System).

User equipment in this application may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (such as RAN, Radio Access Network). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS, Personal Communication Service) phone, a cordless telephone set, a Session Initiation Protocol (SIP) phone, a wireless local loop (WLL, Wireless Local Loop) station, or a personal digital assistant (PDA, Personal Digital Assistant). The wireless terminal may also be called a system, a subscriber unit (Subscriber Unit), a subscriber station (Subscriber Station), a mobile station (Mobile Station), a mobile terminal (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

A base station in this application may include a radio network controller (Radio Network Controller, RNC), and may further include a device in communication with a wireless terminal via one or more sectors at an air interface in an access network. The base station may be configured to mutually convert received over-the-air frames and IP packets and serve as a router between the wireless terminal and a rest portion of the access network, where the rest portion of the access network may include an Internet Protocol (IP) network. The base station may further coordinate attribute management of the air interface. For example, the base station may be a base transceiver station (BTS, Base Transceiver Station) in GSM or CDMA, or may be a NodeB (NodeB) in WCDMA, or may be an evolved NodeB (NodeB, eNB, or e-NodeB, evolved NodeB) in LTE, which is not limited in the present application.

The sequence numbers of the following embodiments of the present invention are merely for description, and do not imply the preference among the embodiments. FIG. 1 is a flowchart of Embodiment 1 of an uplink feedback method according to the present invention. As shown in FIG. 1, the uplink feedback method provided in this embodiment is executed by user equipment. The uplink feedback method in this embodiment includes:

S101. User equipment detects downlink data in at least two consecutive downlink sub-frames.

Specifically, the at least two consecutive downlink sub-frames may be at least two consecutive downlink sub-frames on a single carrier, or may include downlink sub-frames on at least two carriers.

In an implementation scenario in which the at least two consecutive downlink sub-frames are at least two consecutive downlink sub-frames on a single carrier, optionally, a sum of lengths of the at least two consecutive downlink sub-frames on the single carrier is equal to a length of an uplink sub-frame.

In an implementation scenario in which the at least two consecutive downlink sub-frames are at least two consecutive downlink sub-frames on at least two carriers, optionally, the at least two consecutive downlink sub-frames on the at least two carriers may include at least two consecutive downlink sub-frames of a primary cell of the user equipment; or the at least two consecutive downlink sub-frames on the at least two carriers may include at least two consecutive downlink sub-frames of a secondary cell of the user equipment.

Further, a sum of lengths of downlink sub-frames of the primary cell may be equal to a length of an uplink sub-frame of the primary cell; or a sum of lengths of downlink sub-frames of the secondary cell may be equal to a length of an uplink sub-frame of the primary cell.

S102. The user equipment perform joint encoding for a feedback for the downlink data in the at least two consecutive downlink sub-frames.

Specifically, a quantity of pieces of HARQ feedback information in joint encoding information is greater than a quantity of cells.

S103. The user equipment transmits, in an uplink sub-frame corresponding to the last sub-frame of the at least two consecutive downlink sub-frames, joint uplink feedback information for the at least two consecutive downlink sub-frames.

Specifically, the joint uplink feedback information may include joint encoding information of the at least two consecutive downlink sub-frames, where the joint encoding information refers to HARQ information in a joint uplink feedback and a channel quality indicator CQI.

According to the uplink feedback method provided in this embodiment, when user equipment receives downlink data transmitted by a base station by using at least two consecutive downlink sub-frames, the user equipment transmits, in an uplink sub-frame corresponding to the at least two consecutive downlink sub-frames, joint uplink feedback information for the at least two consecutive downlink sub-frames to the base station, which implements uplink feedback when downlink bandwidth is different from uplink bandwidth or when an uplink transmission time interval is different from a downlink transmission time interval.

In order to make the foregoing uplink feedback method more specific, the following separately describes the uplink feedback method provided in the present invention for an implementation scenario in which the at least two consecutive downlink sub-frames are at least two consecutive downlink sub-frames on a single carrier and an implementation scenario in which the at least two consecutive downlink sub-frames are at least two consecutive downlink sub-frames on multiple carriers.

In the implementation scenario in which the at least two consecutive downlink sub-frames are at least two consecutive downlink sub-frames on a single carrier.

Figure 2:
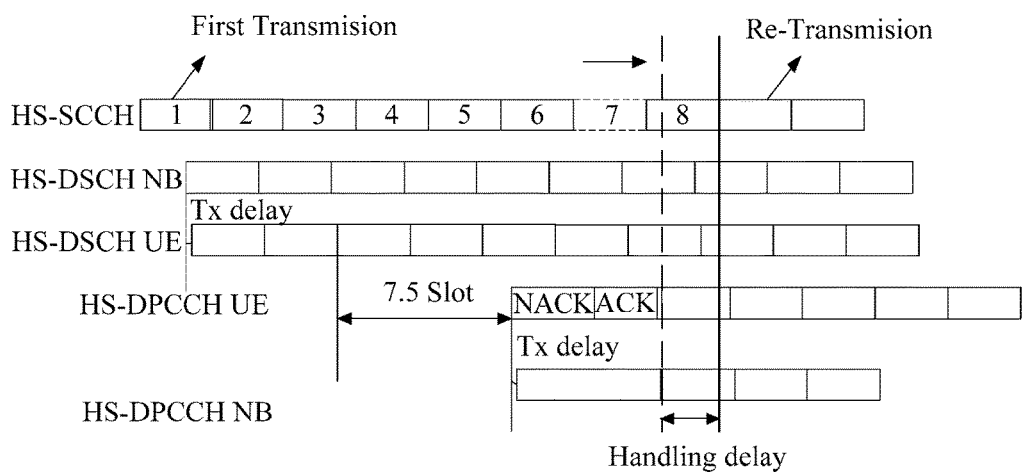
FIG. 2 is a schematic diagram of an uplink feedback for a radio frame according to the present invention.

A radio frame is used an example in this embodiment, and duration of the radio frame is 20 ms, where a length of a downlink sub-frame is 2 ms, and a length of an uplink sub-frame is 4 ms. FIG. 2 is a schematic diagram of an uplink feedback for a radio frame according to the present invention. As shown in FIG. 2, HS-SCCH is a high speed shared control channel, HS-DSCH NB is a high speed downlink shared channel of a base station, HS-DSCH UE is a high speed downlink shared channel of the user equipment, HS-DPCCH UE is high speed dedicated physical control channel of the user equipment, and HS-DPCCH NB is a high speed dedicated physical uplink feedback control channel of the base station.

A joint feedback is performed for two consecutive HS-DPCCH downlink sub-frames by using one uplink feedback HS-DPCCH sub-frame. For a codebook of a hybrid automatic repeat request (Hybrid Automatic Repeat Request, HARQ for short) feedback in this case, a dual carrier (DC, Dual Carrier) joint feedback codebook is used, that is, joint uplink feedback information may be determined by using the DC joint feedback codebook. An example in which a sum of lengths of two consecutive downlink sub-frames on a single carrier is equal to a length of one uplink sub-frame is used in this embodiment. Specifically, the following several implementation scenarios are classified:

When the base station transmits downlink data to the user equipment, and the user equipment only receives an HS-SCCH of the first transmission time interval (Transmission Time Interval, TTI for short) or sub-frame, a format of a used feedback codebook is shown in Table 1:

TABLE 1

| ACK | 1 | 1 | 1 | 1 | 1 | 1 | 1 | 1 | 1 | 1 |
|---|---|---|---|---|---|---|---|---|---|---|
| NACK | 0 | 0 | 0 | 0 | 0 | 0 | 0 | 0 | 0 | 0 |

When the base station transmits downlink data to the user equipment, and the user equipment only receives an HS-SCCH of the second TTI or sub-frame, a format of a used feedback codebook is shown in Table 2:

TABLE 2

| ACK | 1 | 1 | 1 | 1 | 1 | 1 | 1 | 1 | 1 | 1 |
|---|---|---|---|---|---|---|---|---|---|---|
| NACK | 0 | 0 | 0 | 0 | 0 | 0 | 0 | 0 | 0 | 0 |

When the base station transmits downlink data to the user equipment, and the user equipment receives HS-SCCHs of two TTIs or sub-frames, a joint feedback is performed for the first sub-frame or TTI and the second sub-frame or TTI, and a format of a used feedback codebook is shown in Table 3, where the first column in the table represents feedback information for the first sub-frame or TTI, and the second column in the table represents feedback information for the second sub-frame or TTI.

The foregoing feedback codebooks in Table 1 and Table 2 may be used interchangeably; that is, the codebook in Table 2 is used for a feedback for the first sub-frame or TTI, and the codebook in Table 1 is used for a feedback for the second sub-frame or TTI.

TABLE 3

| ACK | ACK | 1 | 0 | 1 | 0 | 1 | 0 | 1 | 0 | 1 | 0 |
|---|---|---|---|---|---|---|---|---|---|---|---|
| ACK | NACK | 1 | 1 | 0 | 0 | 1 | 1 | 0 | 0 | 1 | 1 |
| NACK | ACK | 0 | 0 | 1 | 1 | 0 | 0 | 1 | 1 | 0 | 0 |
| NACK | NACK | 0 | 1 | 0 | 1 | 0 | 1 | 0 | 1 | 0 | 1 |

Timing of an uplink feedback of the user equipment is determined according to the last sub-frame of the at least two consecutive downlink sub-frames. For example, when a joint feedback is performed for two consecutive sub-frames, the feedback is performed according to the second sub-frame.

Joint encoding and feedback are performed for at least two consecutive downlink sub-frames of a cell, and the user equipment and the base station may determine a joint feedback by means of an agreement, or an RNC notifies the UE and the base station that a joint feedback needs to be performed for consecutive sub-frames of a primary cell and a sub-frame of a secondary cell, or the base station may notify, by using an instruction message, the UE that a joint feedback needs to be performed for consecutive sub-frames of the cell. For the latter two manners, a network side may instruct, after determining that the UE can support a joint feedback for consecutive sub-frames, the UE to perform a joint feedback for the consecutive sub-frames.

Specifically, for a manner in which the RNC notifies the UE and the base station that a joint feedback needs to be performed for the consecutive sub-frames of the primary cell and the sub-frame of the secondary cell, the UE reports, to the RNC, a capability of supporting a joint feedback for consecutive sub-frames, and the RNC notifies the base station that the UE has the capability, or instructs the base station to decipher feedback information of the UE according to a joint feedback for consecutive sub-frames. For a case in which the RNC instructs the UE to use a joint feedback method for consecutive sub-frames, optionally, sub-frame information may further be indicated in the joint feedback, where the information includes at least one of the following information: a quantity of sub-frames and at least two sub-frame numbers.

For a manner in which the base station may notify, by using an instruction message, the user equipment that a joint feedback needs to be performed for the consecutive sub-frames of the cell, the UE reports, to the RNC, a capability of supporting a joint feedback for consecutive sub-frames, the RNC notifies the base station that the UE has the capability, and the base station instructs the UE to use the joint feedback method for the consecutive sub-frames. Further, sub-frame information may further be indicated in the joint feedback, where the information includes at least one of the following information: a quantity of sub-frames and at least two sub-frame numbers.

A network side may configure a codebook used for a feedback for consecutive sub-frames. Further, the network side may indicate feedback codebooks used during feedback encoding performed when only the first sub-frame is received, when only the second sub-frame is received, and when two sub-frames are received, where the feedback codebooks specifically refer to the foregoing feedback codebooks in Table 1, Table 2, and Table 3.

The foregoing single-carrier configuration manner may also be applicable to configuration in a dual-carrier or multi-carrier scenario.

Figure 3:
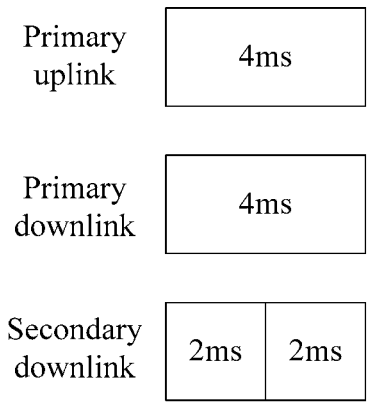
FIG. 3 is a schematic diagram of dual-carrier scenario 1 according to Embodiment 2 of the present invention.

The following uses an implementation scenario in which at least two consecutive downlink sub-frames are at least two consecutive downlink sub-frames on dual carriers as an example for description:

FIG. 3 is a schematic diagram of dual-carrier scenario 1 according to Embodiment 2 of the present invention. As shown in FIG. 3, in this embodiment, at least two consecutive downlink sub-frames include one downlink sub-frame of a primary cell and two consecutive downlink sub-frames of a secondary cell.

Joint encoding and feedback are performed for the one downlink sub-frame of the primary cell and the two consecutive downlink sub-frames of the secondary cell, and user equipment and a base station may determine a joint feedback by pre-negotiation, or a base station or an RNC may notify, by using an instruction message, user equipment that a joint feedback needs to be performed for the consecutive sub-frames of the secondary cell and the sub-frame of the primary cell. Specifically, uplink feedbacks are in the following two data formats, as shown in Table 4 and Table 5, where DC case represents a dual-carrier scenario; Cell activation status represents a cell activation status; —represents deactivation, that is, a joint feedback function is disabled; Cell 1 represents a primary cell; Cell 2 represents a secondary cell; Sub-frame represents a sub-frame; HS-DPCCH sub-frame#1 represents a sub-frame of a high speed dedicated physical control channel; Slot represents a timeslot; A represents ACK; D represents discontinuous transmission; CQI represents a channel quality indicator.

TABLE 4

| DC case | Cell activation status | | | HS-DPCCH sub-frame #1 | | |
|---|---|---|---|---|---|---|
| | Cell 1 | Cell 2 | | | | |
| | Sub-frame 0 | Sub frame 0-1 | Sub frame 0-2 | Slot 0 | Slot 1 | Slot 2 |
| 1 | A | A | A | A0&A1&A2 | CQI0&CQI1 | |
| 2 | A | — | — | A0&D&D | CQI0 | |

In Table 4, DC case 1 indicates that both the primary cell and the secondary cell are activated, a joint feedback is performed for the one sub-frame of the primary cell and the two sub-frames of the secondary cell, and a joint feedback is also performed for CQI0 of the primary cell and CQI1 of the secondary cell. DC case 2 indicates that only the primary cell is activated, and the secondary cell is deactivated. Therefore, uplink feedback is performed only for the CQI of the primary cell. Activation refers that downlink data can be transmitted, and deactivation refers that downlink data cannot be transmitted.

TABLE 5

| DC case | Cell 1 | Cell activation status | | HS-DPCCH sub-frame #1 | | |
|---|---|---|---|---|---|---|
| | | Cell 2 | | | | |
| | Sub-frame 0 | Sub frame 0-1 | Sub frame 0-2 | Slot 0 | Slot 1 | Slot 2 |
| 1 | A | A | A | A0&A1&A2 | CQI0 | CQI1 |
| 2 | A | — | — | A0&D&D | CQI0 | |

In Table 5, DC case 1 indicates that both the primary cell and the secondary cell are activated, a joint feedback is performed for the one sub-frame of the primary cell and the two sub-frames of the secondary cell, but uplink feedback is separately performed for CQI0 of the primary cell and CQI1 of the secondary cell. DC case 2 indicates that only the primary cell is activated, the secondary cell is deactivated, and uplink feedback is independently performed for CQI0 of the primary cell.

For a codebook of an HARQ feedback in this scenario, a DF-3C joint feedback codebook is used. As shown in Table 6, A represents ACK, N represents NACK, D represents discontinuous transmission (DTX, Discontinuous Transmission), and HARQ-ACK message to be transmitted represents HARQ-ACK feedback information.

Specifically, in the HARQ-ACK feedback information, the first piece of feedback information is feedback information for the primary cell, the second piece of feedback information is feedback information for the first sub-frame of the secondary cell, and the third piece of feedback information is feedback information for the second sub-frame of the secondary cell. For example, for A/D/D in the first column, the first piece of feedback information A is ACK feedback information for the primary cell, the second piece of feedback information D is DTX feedback information for the first sub-frame of the secondary cell, and the third piece of feedback information D is DTX feedback information for the second sub-frame of the secondary cell.

Joint encoding and feedback are performed for the downlink sub-frame of the primary cell and the two consecutive downlink sub-frames of the secondary cell, and the user equipment and the base station may determine a joint feedback by means of an agreement, or the RNC notifies the UE and the base station that a joint feedback needs to be performed for the sub-frame of the primary cell and the consecutive sub-frames of the secondary cell, or the base station may notify, by using an instruction message, the user equipment that a joint feedback needs to be performed for the sub-frame of the primary cell and the consecutive sub-frames of the secondary cell.

TABLE 6

| HARQ-ACK message to be transmitted | w0 | w1 | w2 | w3 | w4 | W5 | w6 | w7 | w8 | w9 |
|---|---|---|---|---|---|---|---|---|---|---|
| A/D/D | 1 | 1 | 1 | 1 | 1 | 1 | 1 | 1 | 1 | 1 |
| N/D/D | 0 | 0 | 0 | 0 | 0 | 0 | 0 | 0 | 0 | 0 |
| D/A/D | 1 | 1 | 1 | 1 | 1 | 0 | 0 | 0 | 0 | 0 |
| D/N/D | 0 | 0 | 0 | 0 | 0 | 1 | 1 | 1 | 1 | 0 |
| D/D/A | 1 | 1 | 0 | 0 | 0 | 1 | 1 | 0 | 0 | 0 |
| D/D/N | 0 | 0 | 1 | 1 | 1 | 0 | 0 | 1 | 1 | 1 |
| A/A/D | 1 | 0 | 1 | 0 | 1 | 0 | 1 | 0 | 1 | 0 |
| A/N/D | 1 | 1 | 0 | 0 | 1 | 1 | 0 | 0 | 1 | 1 |
| N/A/D | 0 | 0 | 1 | 1 | 0 | 0 | 1 | 1 | 0 | 0 |
| N/N/D | 0 | 1 | 0 | 1 | 0 | 1 | 0 | 1 | 0 | 1 |
| A/D/A | 1 | 0 | 1 | 1 | 0 | 1 | 1 | 0 | 0 | 1 |
| A/D/N | 0 | 1 | 0 | 1 | 1 | 0 | 1 | 0 | 0 | 1 |
| N/D/A | 0 | 0 | 0 | 1 | 1 | 1 | 1 | 0 | 1 | 0 |
| N/D/N | 1 | 0 | 0 | 1 | 1 | 1 | 0 | 1 | 0 | 0 |
| D/A/A | 0 | 1 | 1 | 1 | 0 | 1 | 0 | 0 | 1 | 0 |
| D/A/N | 1 | 0 | 1 | 0 | 0 | 1 | 0 | 1 | 1 | 0 |
| D/N/A | 0 | 1 | 1 | 0 | 0 | 0 | 1 | 0 | 1 | 1 |
| D/N/N | 0 | 0 | 0 | 0 | 1 | 0 | 1 | 0 | 1 | 1 |
| A/A/A | 1 | 1 | 0 | 1 | 0 | 0 | 1 | 1 | 1 | 0 |
| A/A/N | 0 | 1 | 1 | 0 | 1 | 1 | 1 | 1 | 0 | 0 |
| A/N/A | 1 | 0 | 0 | 1 | 0 | 0 | 0 | 0 | 1 | 1 |
| A/N/N | 0 | 0 | 1 | 0 | 1 | 1 | 0 | 0 | 0 | 1 |
| N/A/A | 1 | 1 | 1 | 0 | 0 | 0 | 0 | 1 | 0 | 1 |
| N/A/N | 0 | 1 | 0 | 0 | 1 | 0 | 0 | 1 | 1 | 0 |

TABLE 6-continued

| HARQ-ACK message to be transmitted | w0 | w1 | w2 | w3 | w4 | W5 | w6 | w7 | w8 | w9 |
|---|---|---|---|---|---|---|---|---|---|---|
| N/N/A | 1 | 0 | 0 | 0 | 1 | 0 | 1 | 1 | 0 | 1 |
| N/N/N | 1 | 1 | 1 | 1 | 0 | 1 | 0 | 1 | 0 | 0 |
| PRE/POS | | | | | | | | | | |
| PRE | 0 | 0 | 1 | 0 | 0 | 1 | 0 | 0 | 1 | 0 |
| POST | 0 | 1 | 0 | 0 | 1 | 0 | 0 | 1 | 0 | 0 |

Timing of an uplink feedback of the user equipment is performed based on the downlink sub-frame of the primary cell or the second sub-frame of the secondary cell.

Figure 4:
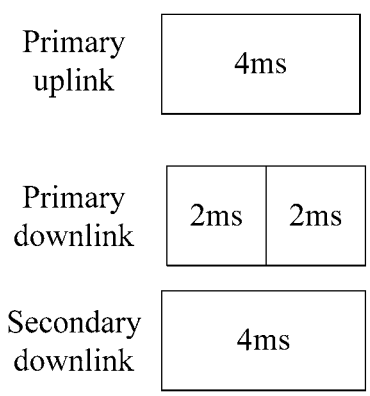
FIG. 4 is a schematic diagram of dual-carrier scenario 2 according to Embodiment 3 of the present invention.

FIG. 4 is a schematic diagram of dual-carrier scenario 2 according to Embodiment 3 of the present invention. As shown in FIG. 4, in this embodiment, at least two consecutive downlink sub-frames include two consecutive downlink sub-frames of a primary cell and one downlink sub-frame of a secondary cell.

Order of feedback information is: the first downlink sub-frame of the primary cell, the second downlink sub-frame of the primary cell, and the downlink sub-frame of the secondary cell.

Joint encoding and feedback are performed for the two consecutive downlink sub-frames of the primary cell and the one downlink sub-frame of the secondary cell, and user equipment and a base station may determine a joint feedback by means of an agreement, or an RNC notifies UE and a base station that a joint feedback needs to be performed for the consecutive sub-frames of the primary cell and the sub-frame of the secondary cell, or a base station may notify, by using an instruction message, user equipment that a joint feedback needs to be performed for the consecutive sub-frames of the primary cell and the sub-frame of the secondary cell. Specifically, uplink feedbacks are in the following two data formats, as shown in Table 7 and Table 8.

For a specific configuration manner, the configuration manner in a single-carrier scenario may be extensively used, and details are not described herein again. In addition, in a multi-carrier scenario, a network may configure order of sub-frames of the primary cell and the secondary cell in a joint feedback for multiple carriers.

TABLE 7

| | Cell activation status | | | | | |
|---|---|---|---|---|---|---|
| | Cell 1 | | Cell 2 | | | |
| DC case | Sub-frame 0 | Sub frame 1 | Sub frame 0 | HS-DPCCH sub-frame #1 | | |
| | | | | Slot 0 | Slot 1 | Slot 2 |
| 1 | A | A | A | A0&A1&A2 | CQI0&CQI1 | |
| 2 | A | A | — | A0&A1&D | CQI0 | |

In Table 7, DC case 1 indicates that both the primary cell and the secondary cell are activated, a joint feedback is performed for the two sub-frames of the primary cell and the one sub-frame of the secondary cell, and a joint feedback is also performed for CQI0 of the primary cell and CQI1 of the secondary cell. DC case 2 indicates that only the primary cell is activated, the secondary cell is deactivated, a joint feedback is performed for the two sub-frames of the primary cell, and uplink feedback is performed for CQI0 of the primary cell.

TABLE 8

| | Cell activation status | | | | | |
|---|---|---|---|---|---|---|
| | Cell 1 | | Cell 2 | | | |
| DC case | Sub-frame 0 | Sub frame 1 | Sub frame 0 | HS-DPCCH sub-frame #1 | | |
| | | | | Slot 0 | Slot 1 | Slot 2 |
| 1 | A | A | A | A0&A1&A2 | CQI0 | CQI1 |
| 2 | A | A | — | A0&A1&D | CQI0 | |

In Table 8, DC case 1 indicates that both the primary cell and the secondary cell are activated, a joint feedback is performed for the two sub-frames of the primary cell and the one sub-frame of the secondary cell, but uplink feedback is separately performed for CQI0 of the primary cell and CQI1 of the secondary cell. DC case 2 indicates that only the primary cell is activated, the secondary cell is deactivated, a joint feedback is performed for the two sub-frames of the primary cell, and uplink feedback is independently performed for CQI0 of the primary cell.

For a codebook of an HARQ feedback in this case, the DF-3C joint feedback codebook in Embodiment 2 is also used, as shown in Table 9:

TABLE 9

| HARQ-ACK message to be transmitted | $w_0$ | $w_1$ | $w_2$ | $w_3$ | $w_4$ | $w_5$ | $w_6$ | $w_7$ | $w_8$ | $w_9$ |
|---|---|---|---|---|---|---|---|---|---|---|
| A/D/D | 1 | 1 | 1 | 1 | 1 | 1 | 1 | 1 | 1 | 1 |
| N/D/D | 0 | 0 | 0 | 0 | 0 | 0 | 0 | 0 | 0 | 0 |
| D/A/D | 1 | 1 | 1 | 1 | 1 | 0 | 0 | 0 | 0 | 0 |
| D/N/D | 0 | 0 | 0 | 0 | 0 | 1 | 1 | 1 | 1 | 1 |
| D/D/A | 1 | 1 | 0 | 0 | 0 | 1 | 1 | 0 | 0 | 0 |
| D/D/N | 0 | 0 | 1 | 1 | 1 | 0 | 0 | 1 | 1 | 1 |
| A/A/D | 1 | 0 | 1 | 0 | 1 | 0 | 1 | 0 | 1 | 0 |
| A/N/D | 1 | 1 | 0 | 0 | 1 | 1 | 0 | 0 | 1 | 1 |
| N/A/D | 0 | 0 | 1 | 1 | 0 | 0 | 1 | 1 | 0 | 0 |
| N/N/D | 0 | 1 | 0 | 1 | 0 | 1 | 0 | 1 | 0 | 1 |
| A/D/A | 1 | 0 | 1 | 0 | 1 | 1 | 0 | 0 | 0 | 1 |
| A/D/N | 0 | 1 | 0 | 1 | 1 | 0 | 1 | 0 | 0 | 1 |
| N/D/A | 0 | 0 | 0 | 1 | 1 | 1 | 1 | 0 | 1 | 0 |
| N/D/N | 1 | 0 | 0 | 1 | 1 | 0 | 1 | 0 | 1 | 0 |
| D/A/A | 0 | 1 | 1 | 1 | 0 | 1 | 0 | 0 | 1 | 0 |
| D/A/N | 1 | 0 | 1 | 0 | 0 | 1 | 0 | 1 | 1 | 0 |
| D/N/A | 0 | 1 | 1 | 0 | 0 | 0 | 1 | 0 | 1 | 1 |
| D/N/N | 0 | 0 | 0 | 0 | 1 | 0 | 1 | 0 | 1 | 1 |
| A/A/A | 1 | 1 | 0 | 1 | 0 | 0 | 1 | 1 | 1 | 0 |
| A/A/N | 0 | 1 | 1 | 0 | 1 | 1 | 1 | 1 | 0 | 0 |
| A/N/A | 1 | 0 | 0 | 1 | 0 | 0 | 0 | 0 | 1 | 1 |
| A/N/N | 0 | 0 | 1 | 0 | 1 | 1 | 0 | 0 | 0 | 1 |
| N/A/A | 1 | 1 | 1 | 0 | 0 | 0 | 0 | 1 | 0 | 1 |
| N/A/N | 0 | 1 | 0 | 0 | 1 | 0 | 0 | 1 | 1 | 0 |
| N/N/A | 1 | 0 | 0 | 0 | 1 | 0 | 1 | 1 | 0 | 1 |
| N/N/N | 1 | 1 | 1 | 1 | 0 | 1 | 0 | 1 | 0 | 0 |
| PRE/POS | | | | | | | | | | |
| PRE | 0 | 0 | 1 | 0 | 0 | 1 | 0 | 0 | 1 | 0 |
| POST | 0 | 1 | 0 | 0 | 1 | 0 | 0 | 1 | 0 | 0 |

Timing of an uplink feedback of the user equipment is performed based on the downlink sub-frame of the secondary cell or the second sub-frame of the primary cell.

Specifically, according to another representation method of a joint feedback, in HARQ-ACK feedback information, the first piece of feedback information is feedback information for the secondary cell, the second piece of feedback information is feedback information for the first sub-frame of the primary cell, and the third piece of feedback information is feedback information for the second sub-frame of the primary cell.

For a specific configuration manner, the configuration manner in the single-carrier scenario may be extensively used. Optionally, in a multi-carrier scenario, a network may configure order of sub-frames of the primary cell and the secondary cell in a joint feedback for multiple carriers; or a network side may configure a reference codebook used for a joint feedback for multiple carriers.

Figure 5:
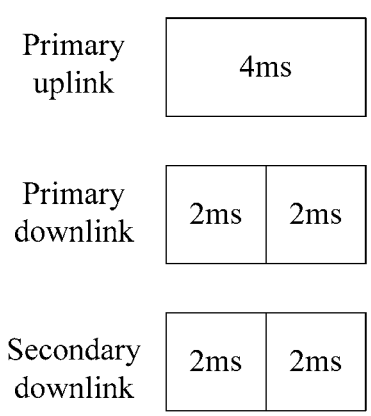
FIG. 5 is a schematic diagram of dual-carrier scenario 3 according to Embodiment 4 of the present invention.

FIG. 5 is a schematic diagram of dual-carrier scenario 3 according to Embodiment 4 of the present invention. As shown in FIG. 5, in this embodiment, at least two consecutive downlink sub-frames include two consecutive downlink sub-frames of a primary cell and two consecutive downlink sub-frames of a secondary cell.

Order of feedback information is: the first downlink sub-frame of the primary cell, the second downlink sub-frame of the primary cell, the first downlink sub-frame of the secondary cell, and the second downlink sub-frame of the secondary cell.

Joint encoding and feedback are performed for the two consecutive downlink sub-frames of the primary cell and the two consecutive downlink sub-frames of the secondary cell, and user equipment and a base station may determine a joint feedback by pre-negotiation, or a base station may notify, by using an instruction message, user equipment that a joint feedback needs to be performed for the consecutive sub-frames of the primary cell and the consecutive sub-frames of the secondary cell. Specifically, uplink feedbacks are in the following two data formats, as shown in Table 10 and Table 11.

TABLE 10

| Cell activation status | | | | HS-DPCCH sub-frame #1 | | |
|---|---|---|---|---|---|---|
| Cell 1 Sub-frame Group 0 | | Cell 2 Sub-frame Group 1 | | | | |
| Sub | Sub | Sub | Sub | | | |
| DC case 0 | 1 | 0 | 1 | Slot 0 | Slot 1 | Slot 2 |
| 3  A | A | A | A | A0&A1  A2&A3 | CQI0 | CQI1 |
| 4  A | A | — | — | A0&A1  D&D | CQI0 | |

In Table 10, DC case 3 indicates that both the primary cell and the secondary cell are activated, a joint feedback is performed for the two sub-frames of the primary cell and the two sub-frames of the secondary cell, but uplink feedback is separately performed for CQI0 of the primary cell and CQI1 of the secondary cell. DC case 2 indicates that only the primary cell is activated, the secondary cell is deactivated, a joint feedback is performed for the two sub-frames of the primary cell, and uplink feedback is independently performed for CQI0 of the primary cell.

TABLE 11

| Cell activation status | | | | HS-DPCCH sub-frame #1 | | |
|---|---|---|---|---|---|---|
| Cell 1 | | Cell 2 | | | | |
| Sub frame | Sub frame | Sub frame | Sub frame | | | |
| DC case 0 | 1 | 0 | 1 | Slot 0 | Slot 1 | Slot 2 |
| 3  A | A | A | A | A0&A1  A2&A3 | CQI0&CQI1 | |
| 4  A | A | — | — | A0&A1  D&D | CQI0 | |

In Table 11, DC case 1 represents that both the primary cell and the secondary cell are activated, a joint feedback is performed for the two sub-frames of the primary cell and the two sub-frames of the secondary cell, and a joint feedback is also performed for CQI0 of the primary cell and CQI1 of the secondary cell. DC case 2 represents that only the primary cell is activated, the secondary cell is deactivated, a joint feedback is performed for the two sub-frames of the primary cell, and uplink feedback is performed for CQI0 of the primary cell.

For a codebook of an HARQ feedback in this case, the DC joint feedback codebook in Embodiment 1 is used. Similar to the implementation scenario in which at least two consecutive downlink sub-frames are a single carrier, a joint feedback for the first sub-frame and the second sub-frame that are of the primary cell and a joint feedback for the first sub-frame and the second sub-frame that are of the secondary cell are also classified into three cases, the feedback codebook formats shown in Table 1, Table 2, and Table 3 are used, and details are not described herein again. A network may configure order of sub-frames of the primary cell and the secondary cell in a joint feedback for multiple carriers.

Optionally, another encoding manner for a joint feedback may be that: a joint feedback is performed for the first sub-frame of the primary cell and the first sub-frame of the secondary cell, and A0&A1 are fed back by using the codebook in Table 1, Table 2, or Table 3; a joint feedback is performed for the second sub-frame of the primary cell and the second sub-frame of the secondary cell, and A2&A3 are fed back by using the codebook in Table 1, Table 2, or Table 3.

Further, the network indicates, to the UE or the base station, a codebook for joint feedback. For example, the network may indicate a sub-frame combination manner that is for joint feedback and of sub-frames of the primary cell and the secondary cell, and a corresponding codebook to be used.

Figure 6:
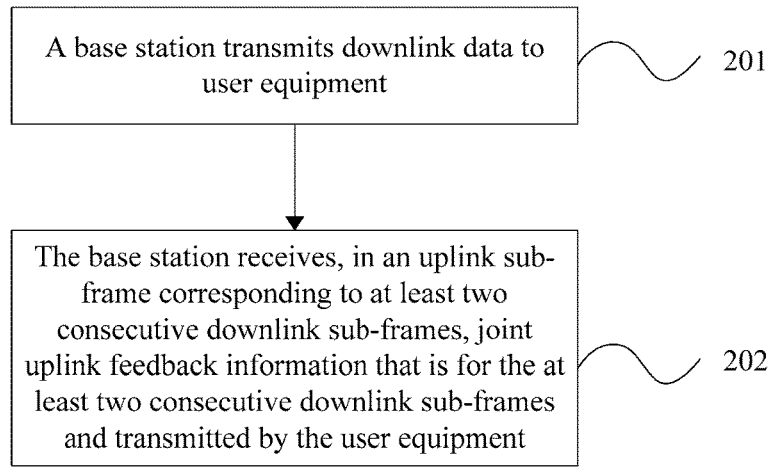
FIG. 6 is a flowchart of Embodiment 2 of an uplink feedback method according to the present invention.

FIG. 6 is a flowchart of Embodiment 2 of an uplink feedback method according to the present invention. As shown in FIG. 6, the uplink feedback method provided in this embodiment is executed by a base station. The uplink feedback method in this embodiment includes:

S201. The base station transmits downlink data to user equipment.

Specifically, at least two consecutive downlink sub-frames may be at least two consecutive downlink sub-frames on a single carrier, or may include downlink sub-frames on at least two carriers.

In an implementation scenario in which the at least two consecutive downlink sub-frames are at least two consecutive downlink sub-frames on a single carrier, optionally, a sum of lengths of the at least two consecutive downlink sub-frames on the single carrier is equal to a length of an uplink sub-frame. For example, in a single-carrier scenario, when downlink carrier bandwidth is two times uplink carrier bandwidth, a length of an uplink sub-frame is two times a length of a downlink sub-frame.

In an implementation scenario in which the at least two consecutive downlink sub-frames are at least two consecutive downlink sub-frames on at least two carriers, optionally, the at least two consecutive downlink sub-frames on the at least two carriers may include at least two consecutive downlink sub-frames of a primary cell of the user equipment; or the at least two consecutive downlink sub-frames on the at least two carriers may include at least two consecutive downlink sub-frames of a secondary cell of the user equipment. For example, in a dual-carrier scenario, when uplink bandwidth of a primary carrier cell is half downlink bandwidth of a primary cell or a secondary cell, a length of an uplink sub-frame of the primary cell is two times a length of a downlink sub-frame of the primary cell or the secondary cell.

Further, a sum of lengths of downlink sub-frames of the primary cell may be equal to a length of an uplink sub-frame of the primary cell; or a sum of lengths of downlink sub-frames of the secondary cell may be equal to a length of an uplink sub-frame of the primary cell.

S202. The base station receives, in an uplink sub-frame corresponding to at least two consecutive downlink sub-frames, joint uplink feedback information that is for the at least two consecutive downlink sub-frames and transmitted by the user equipment.

Optionally, the joint uplink feedback information includes joint encoding information of the at least two consecutive downlink sub-frames, where the joint encoding information refers to HARQ information in a joint uplink feedback and a channel quality indicator CQI. The HARQ information that is fed back includes ACK acknowledgement or NACK non-acknowledgement information for the at least two consecutive downlink sub-frames. For example, for a single-carrier scenario, the HARQ information includes received feedback information corresponding to a quantity of downlink sub-frames; for a dual-carrier scenario, the HARQ information includes received feedback information for downlink sub-frames of multiple carriers. The channel quality indicator includes a quantity of channel quality indicators of one cell of the at least two consecutive downlink sub-frames. For example, for a single-carrier scenario, there is only one piece of CQI information; for a dual-carrier scenario, there are two pieces of CQI information.

According to the uplink feedback method provided in this embodiment, a base station transmits downlink data to user equipment, and the user equipment transmits joint uplink feedback information for at least two consecutive downlink sub-frames to the base station, which implements uplink feedback when downlink bandwidth is different from uplink bandwidth or when an uplink transmission time interval is greater than a downlink transmission time interval.

Figure 7:
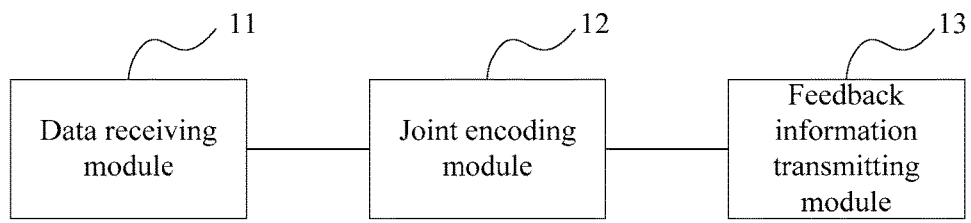
FIG. 7 is a schematic structural diagram of Embodiment 1 of user equipment according to the present invention.

FIG. 7 is a schematic structural diagram of Embodiment 1 of user equipment according to the present invention. As shown in FIG. 7, the user equipment provided in this embodiment includes: a data receiving module 11, a joint encoding module 12, and a feedback information transmitting module 13.

The data receiving module 11 is configured to detect downlink data in at least two consecutive downlink sub-frames.

The joint encoding module 12 is configured to perform joint encoding for a feedback for the downlink data in the at least two consecutive downlink sub-frames.

The feedback information transmitting module 13 is configured to transmit, in an uplink sub-frame corresponding to the last sub-frame of the at least two consecutive downlink sub-frames, joint uplink feedback information for the at least two consecutive downlink sub-frames.

Specifically, the at least two consecutive downlink sub-frames may be at least two consecutive downlink sub-frames on a single carrier, or may include downlink sub-frames on at least two carriers.

In an implementation scenario in which the at least two consecutive downlink sub-frames are at least two consecutive downlink sub-frames on a single carrier, optionally, a sum of lengths of the at least two consecutive downlink sub-frames on the single carrier is equal to a length of an uplink sub-frame.

In an implementation scenario in which the at least two consecutive downlink sub-frames are at least two consecutive downlink sub-frames on at least two carriers, optionally, the at least two consecutive downlink sub-frames on the at least two carriers may include at least two consecutive downlink sub-frames of a primary cell of the user equipment; or the at least two consecutive downlink sub-frames on the at least two carriers may include at least two consecutive downlink sub-frames of a secondary cell of the user equipment.

Further, a sum of lengths of downlink sub-frames of the primary cell may be equal to a length of an uplink sub-frame of the primary cell; or a sum of lengths of downlink sub-frames of the secondary cell may be equal to a length of an uplink sub-frame of the primary cell.

Optionally, the joint uplink feedback information includes joint encoding information of the at least two consecutive downlink sub-frames, where the joint encoding information refers to a data format of a joint uplink feedback and a channel quality indicator CQI, and a quantity of pieces of HARQ feedback information in the joint encoding information is greater than a quantity of cells.

The user equipment in this embodiment may be configured to execute the technical solution of the method embodiment shown in FIG. 1, and implementation principles and technical effects of the user equipment are similar and are not described herein again.

Figure 8:
FIG. 8 is a schematic structural diagram of Embodiment 1 of a base station according to the present invention.

FIG. 8 is a schematic structural diagram of Embodiment 1 of a base station according to the present invention. As shown in FIG. 8, the base station provided in this embodiment includes: a data transmitting module 21 and a feedback information receiving module 22.

The data transmitting module 21 is configured to transmit downlink data to user equipment.

The feedback information receiving module 22 is configured to receive, in an uplink sub-frame corresponding to at least two consecutive downlink sub-frames, joint uplink feedback information that is for the at least two consecutive downlink sub-frames and transmitted by the user equipment.

Specifically, the at least two consecutive downlink sub-frames may be at least two consecutive downlink sub-frames on a single carrier, or may include downlink sub-frames on at least two carriers.

In an implementation scenario in which the at least two consecutive downlink sub-frames are at least two consecutive downlink sub-frames on a single carrier, optionally, a sum of lengths of the at least two consecutive downlink sub-frames on the single carrier is equal to a length of an uplink sub-frame.

In an implementation scenario in which the at least two consecutive downlink sub-frames are at least two consecutive downlink sub-frames on at least two carriers, optionally, the at least two consecutive downlink sub-frames on the at least two carriers may include at least two consecutive downlink sub-frames of a primary cell of the user equipment; or the at least two consecutive downlink sub-frames on the at least two carriers may include at least two consecutive downlink sub-frames of a secondary cell of the user equipment.

Further, a sum of lengths of downlink sub-frames of the primary cell may be equal to a length of an uplink sub-frame of the primary cell; or a sum of lengths of downlink sub-frames of the secondary cell may be equal to a length of an uplink sub-frame of the primary cell.

Optionally, the joint uplink feedback information includes joint encoding information of the at least two consecutive downlink sub-frames, where the joint encoding information refers to a data format of a joint uplink feedback and a channel quality indicator CQI, and a quantity of pieces of HARQ feedback information in the joint encoding information is greater than a quantity of cells.

The base station in this embodiment may be configured to execute the technical solution of the method embodiment shown in FIG. 6, and implementation principles and technical effects of the base station are similar and are not described herein again.

Figure 9:
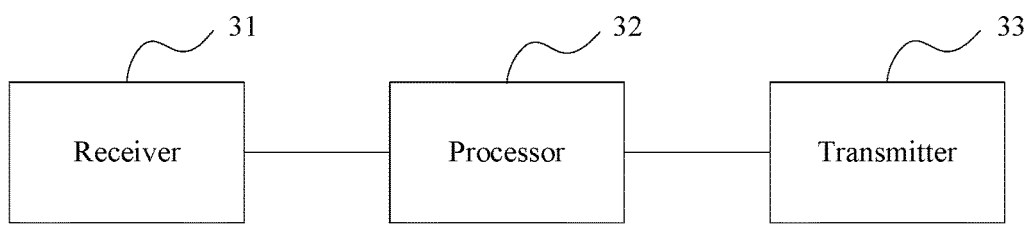
FIG. 9 is a schematic structural diagram of Embodiment 2 of user equipment according to the present invention.

FIG. 9 is a schematic structural diagram of Embodiment 2 of user equipment according to the present invention. As shown in FIG. 9, the user equipment provided in this embodiment includes: a receiver 31, a processor 32, and a transmitter 33.

The receiver 31 is configured to detect downlink data in at least two consecutive downlink sub-frames.

The processor 32 is configured to perform joint encoding for a feedback for the downlink data in the at least two consecutive downlink sub-frames.

The transmitter 33 is configured to transmit, in an uplink sub-frame corresponding to the at least two consecutive downlink sub-frames, joint uplink feedback information for the at least two consecutive downlink sub-frames to a base station.

The user equipment in this embodiment may be configured to execute the technical solution of the method embodiment shown in FIG. 1, and implementation principles and technical effects of the user equipment are similar and are not described herein again.

Figure 10:
FIG. 10 is a schematic structural diagram of Embodiment 2 of a base station according to the present invention.

FIG. 10 is a schematic structural diagram of Embodiment 2 of a base station according to the present invention. As shown in FIG. 10, the base station provided in this embodiment includes: a transmitter 41 and a receiver 42.

The transmitter 41 is configured to transmit downlink data to user equipment.

The receiver 42 is configured to receive, in an uplink sub-frame corresponding to at least two consecutive downlink sub-frames, joint uplink feedback information that is for the at least two consecutive downlink sub-frames and transmitted by the user equipment.

The base station in this embodiment may be configured to execute the technical solution of the method embodiment shown in FIG. 6, and implementation principles and technical effects of the base station are similar and are not described herein again.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An uplink feedback method, comprising:
   detecting, by a user equipment, downlink data in at least two consecutive downlink sub-frames;
   joint encoding, by the user equipment, feedback signals responding to the downlink data in the at least two consecutive downlink sub-frames to obtain joint uplink feedback information; and
   transmitting, by the user equipment in an uplink sub-frame used for transmitting feedback information for one of the at least two consecutive downlink sub-frames, the joint uplink feedback information for the at least two consecutive downlink sub-frames;
   wherein length of the uplink sub-frame used for transmitting the feedback information is N multiplied by length of one downlink sub-frame in the at least two consecutive downlink sub-frames, wherein N is an integer greater than 2.

2. The method according to claim 1, wherein the at least two consecutive downlink sub-frames comprise one selected from the group consisting of:
   at least two consecutive downlink sub-frames of a primary cell of the user equipment; and
   at least two consecutive downlink sub-frames of a secondary cell of the user equipment.

3. The method according to claim 2, wherein:
   when the at least two consecutive downlink sub-frames comprise the at least two consecutive downlink sub-frames of the primary cell of the user equipment, a sum of lengths of downlink sub-frames of the primary cell is equal to a length of an uplink sub-frame of the primary cell; and
   when the at least two consecutive downlink sub-frames comprise the at least two consecutive downlink sub-frames of the secondary cell of the user equipment, a sum of lengths of downlink sub-frames of the secondary cell is equal to the length of the uplink sub-frame of the primary cell.

4. The method according to claim 1, wherein a quantity of pieces of Hybrid automatic repeat request (HARQ) feedback information in the joint uplink feedback information is greater than a quantity of cells.

5. The method according to claim 1, wherein the joint uplink feedback information comprises at least one selected from the group consisting of: (a) a quantity of the at least two consecutive downlink sub-frames, and (b) sub-frame numbers of the at least two consecutive downlink sub-frames.

6. An uplink feedback method, comprising:
   transmitting, by a base station, downlink data to a user equipment; and
   receiving, by the base station in an uplink sub-frame used for transmitting feedback information for one of at least two consecutive downlink sub-frames, joint uplink feedback information responding to the at least two consecutive downlink sub-frames from the user equipment;
   wherein length of the uplink sub-frame used for transmitting the feedback information is N multiplied by length of one downlink sub-frame in the at least two consecutive downlink sub-frames, wherein N is an integer greater than 2.

7. The method according to claim 6, wherein the at least two consecutive downlink sub-frames comprise one selected from the group consisting of:
   at least two consecutive downlink sub-frames of a primary cell of the user equipment; and at least two consecutive downlink sub-frames of a secondary cell of the user equipment.

8. The method according to claim 7, wherein:
when the at least two consecutive downlink sub-frames comprise the at least two consecutive downlink sub-frames of the primary cell of the user equipment, a sum of lengths of downlink sub-frames of the primary cell is equal to a length of an uplink sub-frame of the primary cell; and
when the at least two consecutive downlink sub-frames comprise the at least two consecutive downlink sub-frames of the secondary cell of the user equipment, a sum of lengths of downlink sub-frames of the secondary cell is equal to a length of an uplink sub-frame of the primary cell.

9. The method according to claim 6, wherein a quantity of pieces of Hybrid automatic repeat request (HARQ) feedback information in the joint uplink feedback information is greater than a quantity of cells.

10. The method according to claim 6, wherein the joint uplink feedback information comprises at least one selected from the group consisting of: (a) a quantity of the at least two consecutive downlink sub-frames, and (b) sub-frame numbers of the at least two consecutive downlink sub-frames.

11. A user equipment, comprising:
a receiver;
a transmitter; and
a processor coupled to a non-transitory computer-readable storage medium storing executable instructions, such that when the executable instructions are executed by the processor, the processor facilitates performing:
detecting, by the receiver, downlink data in at least two consecutive downlink sub-frames;
jointly encoding feedback signals responding to the downlink data in the at least two consecutive downlink sub-frames to obtain joint uplink feedback information; and
transmitting, by the transmitter, in an uplink sub-frame used for transmitting feedback information for one of the at least two consecutive downlink sub-frames, the joint uplink feedback information for the at least two consecutive downlink sub-frames;
wherein length of the uplink sub-frame used for transmitting the feedback information is N multiplied by length of one downlink sub-frame in the at least two consecutive downlink sub-frames, wherein N is an integer greater than 2.

12. The apparatus according to claim 11, wherein the at least two consecutive downlink sub-frames comprise one selected from the group consisting of:
at least two consecutive downlink sub-frames of a primary cell of the user equipment; and
at least two consecutive downlink sub-frames of a secondary cell of the user equipment.

13. The apparatus according to claim 12, wherein:
when the at least two consecutive downlink sub-frames comprise the at least two consecutive downlink sub-frames of the primary cell of the user equipment, a sum of lengths of downlink sub-frames of the primary cell is equal to a length of an uplink sub-frame of the primary cell; and
when the at least two consecutive downlink sub-frames comprise the at least two consecutive downlink sub-frames of the secondary cell of the user equipment, a sum of lengths of downlink sub-frames of the secondary cell is equal to a length of an uplink sub-frame of the primary cell.

14. The apparatus according to claim 11, wherein a quantity of pieces of Hybrid automatic repeat request (HARQ) feedback information in the joint uplink feedback information is greater than a quantity of cells.

15. The apparatus according to claim 11, wherein the joint uplink feedback information comprises at least one selected from the group consisting of: (a) a quantity of the at least two consecutive downlink sub-frames, and (b) sub-frame numbers of the at least two consecutive downlink sub-frames.

16. An apparatus, comprising;
a receiver;
a transmitter; and
a processor coupled to a non-transitory computer-readable storage medium storing executable instructions, such that when the executable instructions are executed by the processor, the processor facilitates performing:
transmitting, by the transmitter, downlink data to a user equipment; and
receiving, by the receiver, in an uplink sub-frame used for transmitting feedback information for one of at least two consecutive downlink sub-frames, joint uplink feedback information responding to the at least two consecutive downlink sub-frames and transmitted by the user equipment;
wherein length of the uplink sub-frame used for transmitting the feedback information is N multiplied by length of one downlink sub-frame in the at least two consecutive downlink sub-frames, wherein N is an integer greater than 2.

17. The apparatus according to claim 16, wherein the at least two consecutive downlink sub-frames comprise one selected from the group consisting of:
at least two consecutive downlink sub-frames of a primary cell of the user equipment; and
at least two consecutive downlink sub-frames of a secondary cell of the user equipment.

18. The apparatus according to claim 17, wherein:
when the at least two consecutive downlink sub-frames comprise the at least two consecutive downlink sub-frames of the primary cell of the user equipment, a sum of lengths of downlink sub-frames of the primary cell is equal to a length of an uplink sub-frame of the primary cell; and
when the at least two consecutive downlink sub-frames comprise the at least two consecutive downlink sub-frames of the secondary cell of the user equipment, a sum of lengths of downlink sub-frames of the secondary cell is equal to a length of an uplink sub-frame of the primary cell.

19. The apparatus according to claim 16, wherein a quantity of pieces of Hybrid automatic repeat request (HARQ) feedback information in the joint uplink feedback information is greater than a quantity of cells.

20. The apparatus according to claim 16, wherein the joint uplink feedback information comprises at least one selected from the group consisting of: (a) a quantity of the at least two consecutive downlink sub-frames, and (b) sub-frame numbers of the at least two consecutive downlink sub-frames.

* * * * *